United States Patent [19]

Ford et al.

[11] 4,234,672

[45] Nov. 18, 1980

[54] SHIFTED PHOTOGRAPHIC DYES AND COMPOSITIONS, ELEMENTS AND PROCESSES EMPLOYING THEM

[75] Inventors: John A. Ford; Gregory J. Lestina, both of Rochester, N.Y.

[73] Assignee: Eastman Kodak Company, Rochester, N.Y.

[21] Appl. No.: 949,463

[22] Filed: Oct. 10, 1978

[51] Int. Cl.$^3$ .......................... G03C 3/92; G03C 1/10
[52] U.S. Cl. .................................. 430/222; 430/223; 430/225; 430/241; 430/242; 430/243; 430/390; 430/563
[58] Field of Search .................. 96/3, 29 D, 77, 73, 96/99, 119 PQ; 430/222, 223, 225, 241, 242, 243, 390, 563

[56] References Cited

U.S. PATENT DOCUMENTS

| | | | |
|---|---|---|---|
| 3,230,085 | 1/1966 | Dershowitz et al. | 96/29 D |
| 3,307,947 | 3/1967 | Idelson et al. | 96/29 D |
| 3,579,334 | 5/1971 | Cieciuch et al. | 96/29 D |
| 3,684,513 | 8/1972 | Pelz | 96/99 |
| 3,929,760 | 12/1975 | Landholm et al. | 96/3 |
| 3,931,144 | 1/1976 | Eldredge et al. | 96/3 |
| 3,932,380 | 1/1976 | Krutak et al. | 96/3 |
| 3,942,987 | 3/1976 | Landholm et al. | 96/73 |
| 3,954,476 | 5/1976 | Krutak et al. | 96/73 |
| 4,001,204 | 1/1977 | Krutak et al. | 260/152 |
| 4,013,635 | 3/1977 | Landholm et al. | 96/29 D |

*Primary Examiner*—Won H. Louie, Jr.
*Attorney, Agent, or Firm*—Joshua G. Levitt

[57] ABSTRACT

Shifted photographic dyes which have good storage stability, yet rapidly unblock under processing conditions contain a blocked hydroxy group and a neighboring group that anchimerically assists the hydrolytic cleavage of the blocking group under processing conditions.

28 Claims, No Drawings

SHIFTED PHOTOGRAPHIC DYES AND COMPOSITIONS, ELEMENTS AND PROCESSES EMPLOYING THEM

This invention relates to photographic image dyes, photographic image dye-providing compounds, photographic compositions and elements containing such dyes and compounds and processes for preparing images with such compositions and elements. In particular, this invention relates to such dyes, compounds, compositions, elements and processes wherein the spectral absorption of the dye is shifted by a group which is resistant to cleavage during storage but which is rapidly cleavable under conditions of processing.

Preformed image dyes are contained in photographic elements intended for use with various photographic processes. An image can be formed with such elements by effecting a change in the dye resulting from exposure of the element. For example, in the silver dye bleach process (described in Mees and James, *The Theory of the Photographic Process*, pages 394 and 395, Third Edition, 1966, The MacMillan Company, New York) a uniform distribution of dye is destroyed imagewise as a function of silver halide development. As another example, in various color diffusion transfer processes an imagewise change in mobility of a dye is effected as a function of silver halide development.

In such processes the dye is not acted upon directly by exposing radiation, but responds to a change resulting from development of an exposed photosensitive material, such as silver halide. When the image is to be formed by the substractive technique of color formation, the image dyes generally absorb radiation in the regions of the spectrum to which the associated silver halide is sensitive. Thus, a yellow dye is associated with blue-sensitive silver halide, a magenta dye is associated with green-sensitive silver halide and a cyan dye is associated with red-sensitive silver halide.

If in such an element the dye and the silver halide are incorporated in the same layer, the dye will act as an unwanted filter, absorbing a portion of the exposing radiation which otherwise would reach the silver halide. This results in a loss in sensitivity (photographic speed).

One way to eliminate this unwanted filtering effect is to have the silver halide and the dye in separate layers of the element, while maintaining them in reactive association. By locating the dye further from the source of exposure than the silver halide, the dye is unable to filter exposing radiation before it reaches the silver halide. While this is a useful and practical solution, it increases the number of layers in the photographic element, adding to the thickness of the element and the cost of preparing it.

Another way of eliminating the filtering effect of image dyes is to reversibly shift the spectral absorption of the image dye to shorter wavelengths (hypsochromically) or to longer wavelengths (bathochromically). After exposure, typically during processing, the spectral absorption of the dye is reshifted to return the dye to the desired color. This has been accomplished by attaching to the dye molecule a group which causes a shift in the spectral absorption of the dye and which is uniformly cleaved from the dye during processing. Such a group is referred to as a blocking group.

To understand the way in which a blocking group functions, it is necessary to understand the reason dyes are colored. Coloration of dyes is attributable to absorption of electromagnetic radiation by a conjugated system of single and double bonds in the dye molecule, commonly referred to as a chromophoric system. The chromophoric system is generally terminated with an electron donating group, such as a hydroxy group, which extends the conjugation of the chromophoric system and intensifies the color of the dye. These electron donating groups are referred to as auxochromes. The blocking group is typically an electron withdrawing group, such as an ester, and is joined to the auxochrome so as to modify the availability of electrons in the conjugated system and thereby change the spectral absorption characteristics of the dye.

Shifting of photographic image dyes by blocking an auxochromic group of the dye is further discussed in U.S. Pat. Nos. 3,230,085; 3,307,947 and 3,579,334 (which relate shifting of image dyes intended for use in diffusion transfer elements and processes) and in U.S. Pat. No. 3,684,513 (which relate to shifting of image dyes intended for use in silver dye bleach elements and processes). The dyes described in these patents are shifted in such a way that the bond between the blocking group and the auxochrome is cleaved by hydrolysis, or an analogous reaction, during or after photographic processing.

One difficulty with this approach to eliminating the filtering effect of image dyes is that it is necessary to compromise between two essentially antithetical requirements; i.e., good storage stability of the dye in the shifted, blocked form, and rapid removal of the blocking group with reshifting of the dye, during processing. Thus, this approach has heretofore resulted in dyes that either had good storage stability but became unblocked at an unduly slow rate during processing, or dyes that became unblocked at a desirably rapid rate during processing, but which had poor storage stability due to premature hydrolysis.

Thus, there is a need for shifted photographic image dyes which are stable during storage yet rapidly unblock during processing to reshift to the desired color.

We have found shifted photographic dyes which satisfy this need. Our dyes are blocked hydroxy aromatic dyes which contain a neighboring group that anchimerically assists the hydrolytic cleavage of the blocking group.

With the dyes of this invention, the need to compromise between good storage stability and rapid unblocking of the dye is avoided. The blocking groups employed in our dyes are resistant to premature hydrolysis under storage conditions, yet anchimeric assistance provided by the neighboring group results in rapid unblocking of the dye under the conditions which exist during photographic processing.

Dyes of this invention are generically described in such patents as U.S. Pat. Nos. 3,929,760; 3,942,987; 3,931,144; 3,932,380; 4,001,204; 3,954,476 and 4,013,635 and in such patent applications as Bagrie et al U.S. Patent application Ser. No. 822,188 filed Aug. 5, 1977, Landholm and Robbins U.S. Patent application Ser. No. 850,179 filed Nov. 10, 1977 and Kilminster U.S. Pat. application Ser. No. 870,314 filed Jan. 18, 1978. However, these patents and applications do not show dyes in which the blocking group and the neighboring group are selected so as to provide anchimerically assisted hydrolysis and they do not recognize the advantageous effects that are obtained when such a selection is made.

In accordance with one embodiment of this invention there are provided shifted photographic image dyes as described above.

In accordance with another embodiment of this invention there are provided photographic silver halide emulsions containing shifted photographic image dyes.

In accordance with a further embodiment of this invention there are provided photographic elements comprising a support bearing at least one layer of a photographic silver halide emulsion and a shifted photographic image dye as described above. Included in this embodiment are color diffusion transfer elements.

In accordance with a still further embodiment of this invention there are provided processes of preparing photographic images with the above dyes, emulsions and elements.

Shifted azophenol dyes of this invention can be represented by the structure:

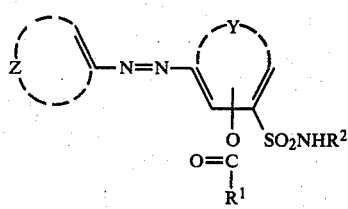  I wherein:

Z represents the atoms to complete an aromatic carbocyclic or heterocyclic nucleus having at least one ring of 5 to 7 atoms;

Y represents the atoms to complete a benzene or naphthalene nucleus;

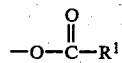

is ortho to the sulfamoyl group;

$R^1$ is a tertiary alkyl group of 4 to 20 carbon atoms or a tertiary amino group of the formula $-N(R^3)_2$ where each $R^3$ is independently alkyl of 1 to 10 carbon atoms or aryl of 6 to 20 carbon atoms; and $R^2$ is a primary or secondary alkyl group of 1 to 20 carbon atoms (including substituted primary and secondary alkyl groups containing such substituents as carboxy, alkoxycarbonyl, aryloxycarbonyl, sulfamoyl and sulfonamido).

A preferred class of dyes of this invention are those designed for use in image transfer elements and processes. Such dyes contain a monitoring group, which, in the presence of an alkaline processing solution, and as a function of silver halide development, is responsible for a change in mobility of the dye. Such dyes are referred to herein as dye-providing compounds. Dye-providing compounds can be initially mobile, and rendered immobile as a function of silver halide development (such as dye developers), or they can be initially immobile, and rendered mobile in the presence of an alkaline processing solution as a function of silver halide development. The latter class of dye-providing compounds are preferred and are referred to as dye-releasing compounds. In such compounds the monitoring group is a ballasted carrier moiety which is cleaved from the dye in the presence of an alkaline processing solution as a function of silver halide development. In dyes having the structure I above, the monitoring group is attached to one of the rings of the dye, either directly or through a substituent thereon.

In the above formula I the aromatic, carbocyclic or heterocyclic nucleus represented by Z can be any of the nuclei employed in azo dyes. These include phenyl, naphthyl, pyridyl, pyrazolyl, indolyl, pyrazolotriazolyl, and the like nuclei. Preferably, Z represents the atoms necessary to complete a phenyl nucleus, which can be substituted with one or more non-interfering substituents such as halogen (e.g., chloro, fluoro, bromo, iodo), lower alkyl (e.g., methyl, ethyl, propyl, butyl), lower alkoxy (e.g., methoxy, ethoxy, propoxy, butoxy), or acid or acid derivative substituents such as acids, esters and amides (e.g., sulfo, sulfonamido, sulfamyl, carboxy, carboxamido or carbamoyl groups which can be unsubstituted or substituted with lower alkyl or lower aryl groups). As used herein, lower alkyl and lower alkoxy refer to such groups containing 1 to 4 carbon atoms while lower aryl refers to aryl groups of 6 to 9 carbon atoms such as phenyl, benzyl, tolyl, methoxyphenyl, chlorophenyl and the like.

The benzene or naphthalene nucleus completed by Y can contain substituents commonly employed with nuclei of azo dyes. These include substituents as described above for the phenyl nucleus completed by Z as well as other substituents such as nitro, cyano, perfluoroalkyl and the like.

In dye releasing compounds of this invention, the ballasted carrier moiety can be attached to the ring completed by Z or to the phenyl or naphthyl ring completed by Y, either directly or through the sulfonamido substituent shown thereon in formula I, above. In a particularly preferred embodiment of dye releasing compounds, the ballasted carrier moiety is attached to the ring completed by Z.

The moiety represented by

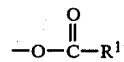

in formula I above represents the blocked auxochromic group. It is joined to the ring so as to be ortho to the sulfamoyl group (where the latter will anchimerically assist hydrolysis) and so as to be in conjugation with the azo group (i.e. ortho or para to the azo group). In a preferred embodiment, the blocked auxochromic group is para to the azo group.

Tertiary alkyl groups represented by $R^1$ can include t-butyl, t-pentyl, t-amyl, t-dodecyl, t-octadecyl and the like. Tertiary amino groups represented by $R^1$ include dimethylamino, diethylamino, di-t-butylamino, dipentylamino, methylphenylamino, methyl-p-nitrophenylamino, and the like. Preferably $R^1$ is a t-alkyl group of 4 to 8 carbon atoms. Most preferably it is a t-butyl group.

It is a significant feature of this invention that $R^1$ is a tertiary group. Such a group provides the necessary bulk to protect the auxochrome from external hydrolytic attack during storage and hence, contributes to the storage stability of the blocked dyes of this invention.

Examples of suitable $R^2$ groups include, methyl, ethyl, propyl, isopropyl, pentyl, isooctyl, dodecyl, hexadecyl, octadecyl, carboxymethyl, carboxypentyl, ethoxycarbonylmethyl, methylsulfamylethyl, and the like. Preferably $R^2$ is a primary alkyl group of 1 to 4 carbon atoms.

It is a feature of our invention that the group represented by $R^2$ is not a tertiary group, or a similar bulky group that will interfere with the ability of the sulfamoyl group to anchimerically assist in the removal of the blocking group.

There is great latitute in selecting a ballasted carrier moiety for incorporation in the dye releasing compound of this invention. Depending upon the nature of the specific ballasted carrier moiety used, it may be attached, or linked, to the dye moiety through various groups. When the carrier moiety is cleaved from the dye moiety, cleavage may take place at such a location that a part of the carrier moiety remains attached to the dye moiety.

Ballasted carrier moieties useful in this invention include a variety of groups from which dye can be released by a variety of mechanisms. Representative ballasted carrier moieties are described, for example, in U.S. Pat. No. 3,227,550 and Canadian Pat. No. 602,607 (release by chromogenic coupling); U.S. Pat. Nos. 3,443,939 and 3,443,940 (release by intramolecular ring closure); U.S. Pat. Nos. 3,628,952, 3,698,987, 3,725,062, 3,728,113, 3,844,785, 4,053,312, 4,055,428 and 4,076,529 and U.S. Application Ser. No. 832,048 filed Sept. 9, 1977 (release after oxidation of carrier); U.S. Pat. No. 3,980,479, U.K. Pat. No. 1,464,104 and 1,464,105 and U.S. Application Ser. No. 589,977 filed June 24, 1975 (release unless carrier is oxidized); and U.S. application Ser. No. 775,025 filed Mar. 7, 1977 (release by reduction of carrier).

The ballasted carrier moiety can be such that a diffusible dye is released therefrom as a direct function of development of a silver halide emulsion. This is ordinarily referred to as negative-working dye release chemistry. Alternatively, the ballasted carrier moiety can be such that a diffusible dye is released therefrom as an inverse function of development of a silver halide emulsion. This is ordinarily referred to as positive-working dye release chemistry.

A preferred class of ballasted carrier moieties for use in negative-working dye release compounds of this invention are the ortho- or para-sulfonamidophenol and naphthol carriers described in U.S. Pat. Nos. 4,053,312, 4,055,428 and 4,076,529 and U.S. application Ser. No. 832,048 filed Sept. 9, 1977. In these compounds the dye moiety is attached through a sulfonamido group which is ortho or para to the phenolic hydroxy group and is released by hydrolysis after oxidation of the carrier moiety.

A preferred class of ballasted carrier moieties for use in positive-working dye release compounds, are the nitrobenzene and quinone carriers described in U.S. application Ser. No. 775,025 filed Mar. 7, 1977. In these compounds the dye moiety is attached to an electrophilic cleavage group (such as a carbamate group) ortho to the nitro group or the quinone oxygen and is released upon reduction of the carrier moiety.

A further preferred class of ballasted carrier moieties for use in positive-working dye release compounds are the hydroquinone carriers described in U.S. Pat. No. 3,980,479. In these compounds the dye moiety is joined to a carbamate group ortho to one of the hydroquinone hydroxy groups.

A yet further preferred class of carriers for use in positive-working dye release compounds are the benzisoxazolone compounds described in U.K. Pat. Nos. 1,464,104 and 1,464,105. In these compounds the dye is attached to the carrier through an electrophilic group and is released unless a nucleophilic group adjacent the electrophilic group is oxidized.

The following are examples of preferred compounds for use in the present invention.

Sulfonamidonaphthols With Blocked Magenta Dyes:

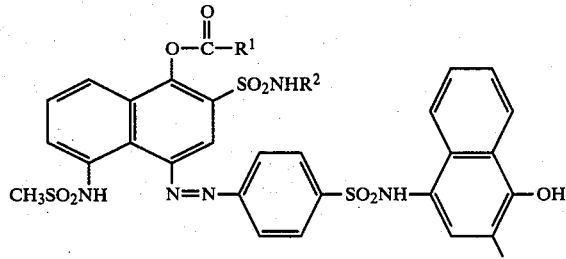

| Compound No. | $R^1$ | $R^2$ | BALL |
|---|---|---|---|
| 1 | $-C(CH_3)_3$ | $-C_2H_5$ | $-CNH(CH_2)_4O-$ phenyl with two $C_5H_{11}$-t groups (C=O) |
| 2 | $-C(CH_3)_3$ | $-C_2H_5$ | $-CN(C_{18}H_{37}-n)_2$ (C=O) |
| 3 | $-C(CH_3)_3$ | $-CH_2COOH$ | $-CNH(CH_2)_4O-$ phenyl with two $C_5H_{11}$-t groups (C=O) |
| 4 | $-C(CH_3)_3$ | $-C_2H_5$ | $-CN(C_{12}H_{25}-n)_2$ (C=O) |

-continued

| | | Sulfonamidonaphthols With Blocked Magenta Dyes: | |
|---|---|---|---|
| 5 | —C(CH$_3$)$_3$ | —CH(CH$_3$)$_2$ | —C(O)N(C$_{18}$H$_{37}$-n)$_2$ |
| 6 | —N(C$_6$H$_5$)$_2$ | —C$_2$H$_5$ | —C(O)NH(CH$_2$)$_4$O-(2,4-di-t-C$_5$H$_{11}$-phenyl) |
| 7 | —N(C$_6$H$_5$)$_2$ | —C$_2$H$_5$ | —C(O)N(C$_{12}$H$_{25}$-n)$_2$ |
| 8 | —N(CH$_3$)$_2$ | —C$_2$H$_5$ | —C(O)N(C$_{12}$H$_{25}$-n)$_2$ |
| 9 | —N(CH$_3$)(4-NO$_2$-C$_6$H$_4$) | —C$_2$H$_5$ | —C(O)N(C$_{12}$H$_{25}$-n)$_2$ |
| 10 | —N(CH$_3$)(C$_6$H$_5$) | —C$_2$H$_5$ | —C(O)NH(CH$_2$)$_4$O-(2,4-di-t-C$_5$H$_{11}$-phenyl) |
| 11 | —C(CH$_3$)$_3$ | —(CH$_2$)$_5$COOH | —C(O)N(C$_{18}$H$_{37}$)$_2$ |
| 12 | —N(C$_6$H$_5$)$_2$ | —(CH$_2$)$_5$COOH | —C(O)N(C$_{18}$H$_{37}$)$_2$ |
| 13 | —C(CH$_3$)$_3$ | —(CH$_2$)$_2$NHSO$_2$CH$_3$ | —C(O)N(C$_{18}$H$_{37}$)$_2$ |
| 14 | —N(CH$_2$CH$_2$CN)$_2$ | —C$_2$H$_5$ | —C(O)N(C$_{18}$H$_{37}$)$_2$ |
| 15 | —N(CH$_2$CN)$_2$ | —C$_2$H$_5$ | —C(O)N(C$_{18}$H$_{37}$)$_2$ |

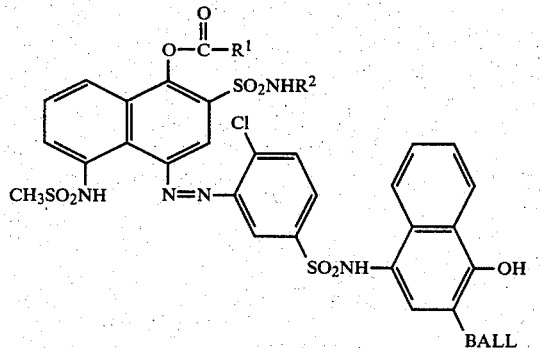

| Compound No. | R$^1$ | R$^2$ | BALL |
|---|---|---|---|
| 16 | —C(CH$_3$)$_3$ | —C$_2$H$_5$ | —C(O)N(C$_{18}$H$_{37}$)$_2$ |

Sulfonamidonaphthols With Blocked Yellow Dyes

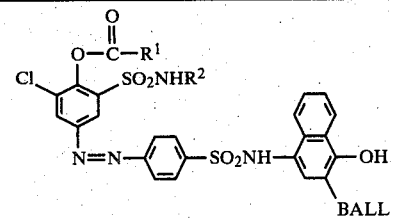

| Compound No. | $R^1$ | $R^2$ | BALL |
|---|---|---|---|
| 17 | $-C(CH_3)_3$ | $-CH_3$ | $-\overset{O}{\underset{\|}{C}}NHCH_2\underset{\underset{C_2H_5}{\|}}{CH}O-\underset{\underset{C_{15}H_{31}}{}}{\text{phenyl}}$ |
| 18 | $-C(CH_3)_3$ | $-C_2H_5$ | $-\overset{O}{\underset{\|}{C}}N(C_{18}H_{37})_2$ |
| 19 | $-C(CH_3)_3$ | $-C_2H_5$ | $-\overset{O}{\underset{\|}{C}}N(C_{12}H_{25})_2$ |

Nitrobenzenes With Blocked Yellow Dyes

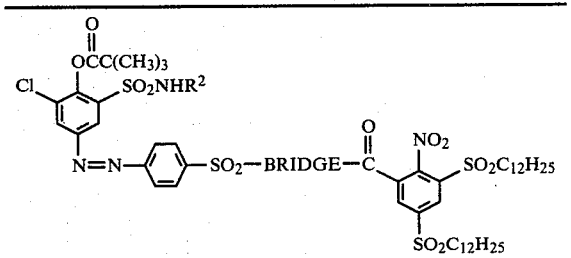

| Compound No. | $R^2$ | BRIDGE |
|---|---|---|
| 26 | $-C_2H_5$ | $-NHCH_2CH_2\underset{\underset{CH_3}{\|}}{N}-$ |
| 27 | $-C_2H_5$ | $-NHCH_2CH_2\underset{\underset{CH_2CH_2OH}{\|}}{N}-$ |
| 28 | $-CH_3$ | $-NHCH_2CH_2\underset{\underset{CH_3}{\|}}{N}-$ |
| 29 | $-CH_2\overset{O}{\underset{\|}{C}}OC_2H_5$ | $-NHCH_2CH_2\underset{\underset{CH_3}{\|}}{N}-$ |
| 30 | $-CH_2CH_2NHSO_2CH_3$ | $-NHCH_2CH_2\underset{\underset{CH_3}{\|}}{N}-$ |

Nitrobenzenes With Blocked Magenta Dyes

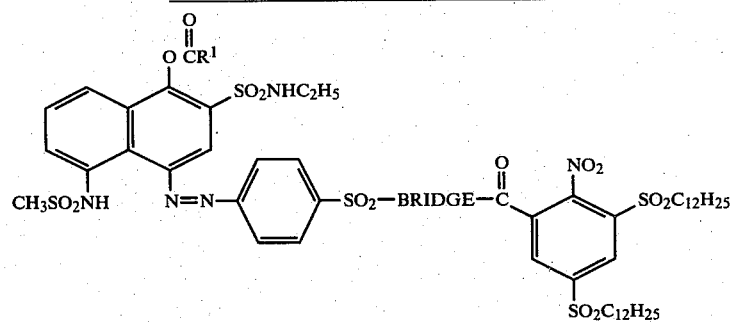

| Compound No. | $R^1$ | BRIDGE |
|---|---|---|
| 20 | $-C(CH_3)_3$ | $-NH(CH_2)_3\underset{\underset{CH_3}{\|}}{\overset{\overset{CH_3}{\|}}{N}}-$ |
| 21 | $-C(CH_3)_3$ | $-NHCH_2-\langle\text{piperidinyl}\rangle-N-$ |
| 22 | $-C(CH_3)_3$ | $-\underset{\underset{CH_3}{\|}}{N}(CH_2)_3\underset{\underset{CH_3}{\|}}{N}-$ |
| 23 | $-C(CH_3)_3$ | $-NH-\langle\text{C}_6\text{H}_4\rangle-SO_2NH(CH_2)_2\underset{\underset{CH_3}{\|}}{N}-$ |
| 24 | $-\underset{\underset{C_2H_5}{\|}}{N}-\langle\text{C}_6\text{H}_4\rangle-SO_2NH_2$ | $-NH(CH_2)_3\underset{\underset{CH_3}{\|}}{N}-$ |
| 25 | $-\underset{\underset{CH_3}{\|}}{N}-\langle\text{C}_6\text{H}_4\rangle-SO_2CH_3$ | $-NH(CH_2)_3\underset{\underset{CH_3}{\|}}{N}-$ |

-continued

Nitrobenzenes With Blocked Yellow Dyes

31 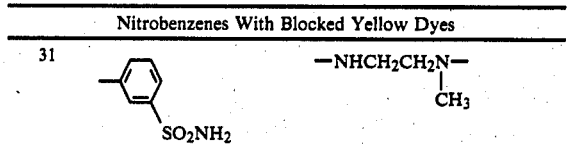

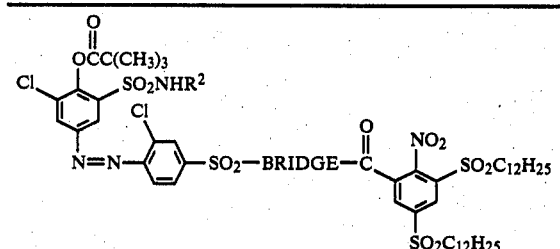

| Compound No. | R² | BRIDGE |
|---|---|---|
| 32 | —CH₃ | —NHCH₂CH₂CH₂N(CH₃)— |
| 33 | —CH₃ | —NHCH₂CH₂N(CH₃)— |

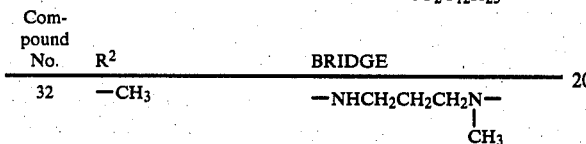

| Compound No. | R² | BRIDGE |
|---|---|---|
| 34 | —CH₃ | —NHCH₂CH₂N(CH₃)— |

Quinones With Blocked Yellow Dyes

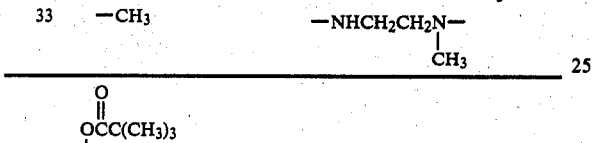

R is:

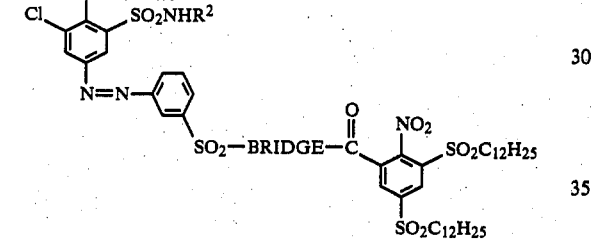

| Compound No. | R² | R⁴ | R⁵ |
|---|---|---|---|
| 35 | —C₂H₅ | —C₁₂H₂₅ | —C₁₂H₂₅ |

Quinones With Blocked Yellow Dyes

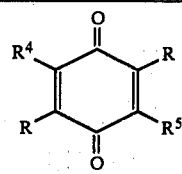

R is:

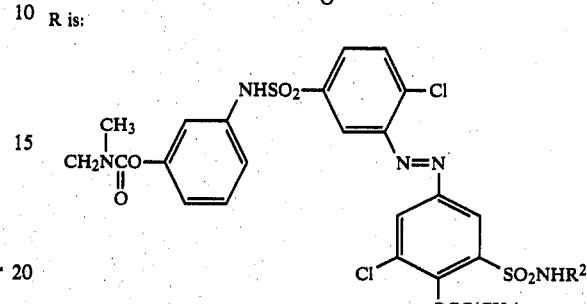

| Compound No. | R² | R⁴ | R⁵ |
|---|---|---|---|
| 36 | —CH₃ | —C₃H₇ | —C₁₆H₃₃ |
| 37 | —CH₃ | —C₁₂H₂₅ | —C₁₂H₂₅ |
| 38 | —CH₃ | —CH(CH₃)—C₁₀H₂₁ | —CH(CH₃)—C₁₀H₂₁ |

Quinones With Blocked Magenta Dyes

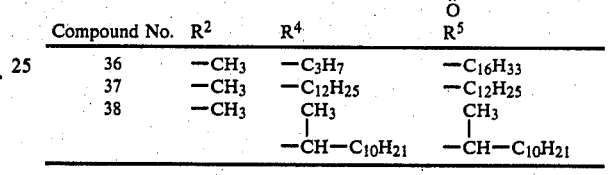

R is:

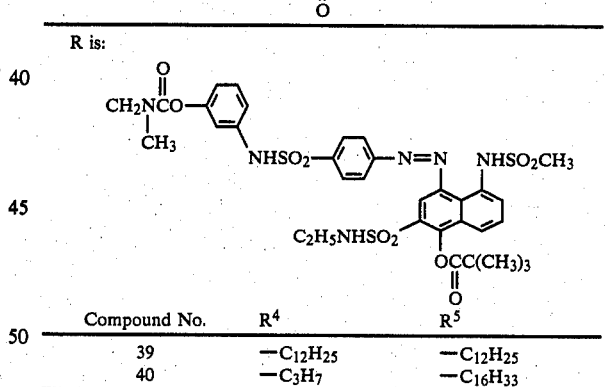

| Compound No. | R⁴ | R⁵ |
|---|---|---|
| 39 | —C₁₂H₂₅ | —C₁₂H₂₅ |
| 40 | —C₃H₇ | —C₁₆H₃₃ |

R is:

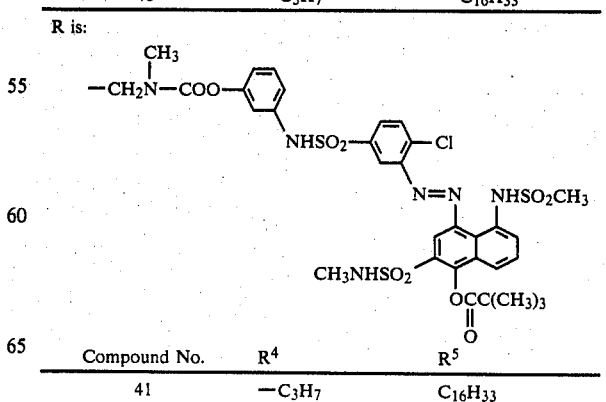

| Compound No. | R⁴ | R⁵ |
|---|---|---|
| 41 | —C₃H₇ | C₁₆H₃₃ |

The photographic elements in which the photographic image dyes of this invention are incorporated can be simple elements comprising a support bearing a layer of the photographic image dye. Preferred elements contain a silver halide emulsion layer and especially preferred are multilayer multicolor silver halide elements. The image dye is preferably incorporated in the silver halide emulsion layer in order to obtain the benefits associated with shifting the spectral absorption of the dye in accordance with this invention. However, if desired, the image dye can be incorporated in another layer of the element where it will be in reactive association with development products generated in the silver halide emulsion layer, or it can be in a layer on a separate sheet support which is brought into contact with the silver halide emulsion layer prior to or during development.

A typical multilayer multicolor photographic element according to this invention can comprise a support having thereon a red-sensitive silver halide emulsion unit having associated therewith a cyan-dye-image-providing material, a green-sensitive silver halide emulsion unit having associated therewith a magenta-dye-image-providing material and a blue-sensitive silver halide emulsion unit having associated therewith a yellow-dye-image-providing material, at least one of the silver halide emulsion units having associated therewith a photographic image dye of the invention. Each silver halide emulsion unit can be composed of one or more layers and the various units and layers can be arranged in different locations with respect to one another in accordance with configurations known in the art.

The elements of the invention can contain additional layers conventional in photographic elements, such as spacer layers, filter layers, antihalation layers, scavenger layers and the like. The support can be any suitable support used with photographic elements. Typical supports include polymeric films, paper (including polymer-coated paper), glass, and the like.

The light-sensitive silver halide emulsions can include coarse, regular, or fine grain silver halide crystals or mixtures thereof and can be comprised of such silver halides as silver chloride, silver bromide, silver bromoiodide, silver chlorobromide, silver chloroiodide, silver chlorobromoiodide, and mixtures thereof. The emulsions can be negative working or direct positive emulsions. They can form latent images predominantly on the surface of the silver halide emulsions or predominantly in the interior of the silver halide grains. They can be chemically and spectrally sensitized in accordance with usual practices. The emulsions typically will be gelatin emulsions although other hydrophilic colloids can be used in accordance with usual practice.

The photographic dyes of this invention can be incorporated in the silver halide emulsions or other vehicles used in the photographic elements, in the same way as photographic image dyes have been incorporated in such emulsions and vehicles in the past. Depending upon the physical properties of the photographic image dye and its physical compatibility with the emulsion or vehicle, it can be dispersed directly therein, it can be mixed with organic solvents and then dispersed in the emulsion or vehicle, or it can be loaded in a latex which is then dispersed in the emulsion or vehicle. The latter technique is described in *Research Disclosure*, July 1977, Item 15930. *Research Disclosure* is published by Industrial Opportunities Limited, Homewell, Havant, Hampshire, PO9 1EF UK.

Further details regarding silver halide emulsions and elements and addenda incorporated therein can be found in *Research Disclosure*, December 1971, Item 9232.

Photographic images can be prepared with photographic elements of this invention by a variety of techniques. Those elements which simply contain a layer of blocked dye on a support can be contacted with an imagewise pattern of base to yield an image of unblocked dye against a background of blocked dye. Representative techniques for generating an imagewise distribution of base are described in U.S. Pat. Nos. 3,451,814 and 3,451,815, (selective exhaustion of alkali as a function of silver halide development and transfer of unexhausted alkali to a receiver sheet) and *Research Disclosure*, February 1975, Item 13023, Paragraph V, pages 48 and 49 (generation of base by exposure and processing of a cobalt(III) complex.)

Additionally, photographic images can be prepared with the photographic elements of this invention by processing the element in accordance with known procedures for processing photographic elements containing preformed image dyes. Silver dye bleach processing can be employed as described, for example, in U.S. Pat. No. 3,684,513, Mees and James, *The Theory Of The Photographic Process*, pages 384 and 395, Third Edition, 1966, The MacMillan Co., or Friedman, *History Of Color Photography*, pages 405–429, 1944. Photographic elements designed for providing photographic images by diffusion transfer processes can be processed as described in the numerous patents and articles relating thereto, a number of which have been referred to herein in connection with the discussion of photographic image dyes.

Inasmuch as these processes employ alkaline processing solutions for development of silver halide, or for other purposes, the blocked image dyes of this invention will be shifted to the desired color concurrent with other processing steps.

As indicated above, a particularly preferred class of dyes of this invention are dye releasing compounds which are nondiffusible as coated in the photographic element but which upon processing release a diffusible dye. The following is a description of preferred photographic processes, photographic elements and photographic film units particularly adapted for use of dye releasing compounds. In this discussion the compounds are referred to alternatively as dye releasing compounds, nondiffusible dye releasing compounds, or nondiffusible compounds.

Photographic color images can be formed with the nondiffusible dye releasing compounds of this invention by treating an imagewise exposed element containing the dye releasing compound with an alkaline processing solution to form an imagewise distribution of diffusible dye as a function of the imagewise exposure of the silver halide emulsion. Images can be formed employing the image-wise released diffusible dye, or the remaining imagewise distribution of nondiffusible compound, or both.

The released diffusible dye can be allowed to diffuse to a receiver sheet or layer to form a transfer image. Alternatively, it can be removed from the element and not used further.

Whether the imagewise distribution of diffusible dye is used to form an image or not, the remaining non-diffusible compound can be used as a retained image in the layer in which it was initially coated. This could include removing residual silver and silver halide by an conventional procedure known to those skilled in the art, such as a bleach bath followed by a fix bath, a bleach-fix bath, etc. It will be noted that alkaline processing of the element unblocks the dye and shifts its spectral absorption, so that the retained image has the desired color.

Alternatively, once the initially formed diffusible dye is removed from the element, the residual non-diffusible compound can be employed to form a transfer image by treating it to yield a second distribution of diffusible dye which can be transferred to a suitable receiver sheet or layer.

Accordingly, a preferred process for producing a photographic image in color according to this invention comprises:

(a) treating an imagewise-exposed photographic element, as described above, with an alkaline processing composition in the presence of a silver halide developing agent to effect development of each of the exposed silver halide emulsion layers, thereby (b) releasing imagewise a diffusible dye as a function of the development of each of the silver halide emulsion layers; and (c) diffusing at least a portion of the imagewise distribution of diffusible dye out of the layer in which it is coated.

The alkaline processing composition employed in this embodiment can be an aqueous solution of an alkaline material, such as an alkali metal hydroxide or carbonate (e.g. sodium hydroxide or sodium carbonate) or an amine (e.g. diethylamine). Preferably the alkaline composition has a pH in excess of 11. Suitable materials for use in such compositions are disclosed in *Research Disclosure*, pages 79-80, November 1976.

Preferably the developing agent is contained in the alkaline processing composition, although it can be contained in a separate solution or process sheet, or it can be incorporated in a layer of the photographic element or film unit. When the developing agent is separate from the alkaline processing composition, the alkaline composition serves to activate the developing agent and provide a medium in which the developing agent can contact and develop developable silver halide.

A variety of silver halide developing agents can be used with the elements of this invention. The choice of a particular developing agent will, to some extent, depend on the ballasted carrier moiety. Suitable developing agents can be selected from such compounds as hydroquinone, aminophenols, (e.g., N-methylaminophenol), 1-phenyl-3-pyrazolidone, 1-phenyl-4,4-dimethyl-3-pyrazolidone, 1-phenyl-4-methyl-4-hydroxymethyl-3-pyrazolidone, N,N-diethyl-p-phenylenediamine, 3-methyl-N,N-diethyl-p-phenylenediamine, 3-methoxy-N,N-diethyl-p-phenylenediamine, N,N,N',N'-tetramethyl-p-phenylenediamine, etc. The non-chromogenic developers in this list are preferred, since they have a reduced propensity to stain dye image-receiving layers.

A photographic film unit which can be processed in accordance with this invention, and which is adapted to be processed by passing the unit between a pair of juxtaposed pressure-applying members, such as would be found in a camera designed for in-camera processing, comprises:

(a) a photographic element, as described above;
(b) a dye image-receiving layer;
(c) an alkaline processing composition; and
(d) means adapted to discharge the alkaline processing composition within the film unit;

the film unit containing a silver halide developing agent.

As indicated previously, the developing agent is preferably incorporated in the alkaline processing composition, although it can be contained in another layer of the film unit.

Preferably, the alkaline processing composition is introduced into reactive association with other components of the film unit from a rupturable container which is adapted to be positioned during processing of the film unit so that a compressive force applied to the container by pressure-applying members will rupture the container and effect a discharge of the containers contents within the film unit. However, other methods of introducing the alkaline processing composition can be employed, e.g., injecting processing solution with communicating members similar to hypodermic syringes which are attached either to a camera or camera cartridge.

Preferred rupturable containers are described in U.S. Pat. Nos. 2,543,181; 2,643,886; 2,653,732; 2,723,051; 3,056,492; 3,056,491 and 3,152,515. In general, such containers comprise a rectangular sheet of fluid- and air-impervious material folded longitudinally upon itself to form two walls which are sealed to one another along their longitudinal and end margins to form a cavity in which processing solution is contained.

Any material can be employed as the image-receiving layer in this invention as long as it will mordant, or otherwise fix, the dyes which diffuse to it. The particular material chosen will, of course, depend upon the dyes to be mordanted. Suitable materials are disclosed in *Research Disclosure*, November 1976, pages 80-82. The image-receiving layer can contain ultraviolet absorbers to protect the dye images from fading due to ultraviolet light, brighteners and similar materials used to protect or enhance photographic dye images.

Additional layers can be incorporated in film units of this invention. These include pH lowering layers (sometimes referred to as acid layers of neutralizing layers), timing or spacing layers, opaque light-reflecting layers, opaque light-absorbing layers, scavenger layers, and the like.

A layer of a pH-lowering material in the film unit will usually increase the stability of the transferred image. Generally, the pH-lowering material will effect a reduction in the pH of the image layer from about 13 or 14 to at least 11 and preferably to 5 to 8 within a short time after introduction of the alkaline processing composition. Suitable materials and their functioning are disclosed in *Research Disclosure*, July 1974, pages 22 and 23 and *Research Disclosure*, July 1975, pages 35-37.

A timing or inert spacer layer can be employed in the practice of this invention over the pH-lowering layer to control pH reduction as a function of the rate at which alkali diffuses through the inert spacer layer. Examples of such timing layers and their functioning are disclosed in the Research Disclosure articles mentioned in the immediately preceding paragraph.

Alkaline-solution-permeable, substantially opaque, light-reflective layers, employed in certain embodiments of film units of this invention, are described in *Research Disclosure*, November 1976, page 82.

Various formats for diffusion transfer film units are known in the art. The layer arrangement employed with them can be used in the film units of this invention. In one useful format the dye image-receiving layer of the film unit is located on a separate support adapted to be superposed on the photographic element after exposure thereof. Such image-receiving layers are generally disclosed, for example, in U.S. Pat. No. 3,362,819.

In another useful format the dye image-receiving layer is located integral with the photographic element and is positioned between the support and the lowermost silver halide emulsion layer. One such format is disclosed in Belgian Pat. No. 757,960. In such a format, the support for the photographic element is transparent and bears, in order, an image-receiving layer, a substantially opaque light-reflective layer, and then the photosensitive layer or layers. After imagewise exposure, a rupturable container containing the alkaline processing composition and an opaque process sheet are brought into superposed position. Pressure-applying members in the camera rupture the container and spread processing composition over the photographic element as the film unit is withdrawn from the camera. The processing composition develops each exposed silver halide emulsion layer and dye images, formed as a function of development, diffuse to the image-receiving layer to provide a right-reading image which is viewed through the transparent support on the opaque reflecting layer background. For other details concerning the format of this particular integral film unit, reference is made to the above-mentioned Belgian Pat. No. 757,960.

Another format is disclosed in Belgian Pat. No. 757,959. In this embodiment, the support for the photographic element is transparent and bears, in order, the image-receiving layer, a substantially opaque, light-reflective layer and the photosensitive layer or layers. A rupturable container, containing an alkaline processing composition and an opacifier, is positioned between the uppermost emulsion layer and a transparent top sheet which has thereon a neutralizing layer and a timing layer. The film unit is placed in a camera, exposed through the transparent top sheet and then passed through a pair of pressure-applying members in the camera as it is being removed therefrom. The pressure-applying members rupture the container and spread processing composition and opacifier over the photosensitive layers to commence development and protect the photosensitive layers from further light exposure. The processing composition develops each silver halide layer and dye images, formed as a result of development, diffuse to the image-receiving layer to provide a right-reading image which is viewed through the transparent support on the opaque reflecting layer background. For further details concerning the format of this particular integral film unit, reference is made to the above-mentioned Belgian Pat. No. 757,959.

Still other useful formats in which this invention can be employed are described in U.S. Pat. Nos. 3,415,644; 3,415,645; 3,415,646; 3,647,437; 3,635,707; and 3,993,486.

The term "nondiffusible" used herein has the meaning commonly applied to the term in photography and denotes materials that for all practical purposes do not migrate nor wander through organic colloid layers such as gelatin in an alkaline medium, in the photographic elements of the invention and preferably when processed in a medium having a pH of 11 or greater. The same meaning is to be attached to the term "immobile". The term "diffusible" as applied to the materials of this invention has the converse meaning and denotes materials having the property of diffusing effectively through the colloid layers of the photographic elements in an alkaline medium. "Mobile" has the same meaning.

The term "associated therewith" as used herein is intended to mean that the materials can be in either the same or different layers so long as the materials are accessible to one another.

The following examples further illustrate this invention.

EXAMPLE 1

Preparation of Blocked Dye Compound No. 2

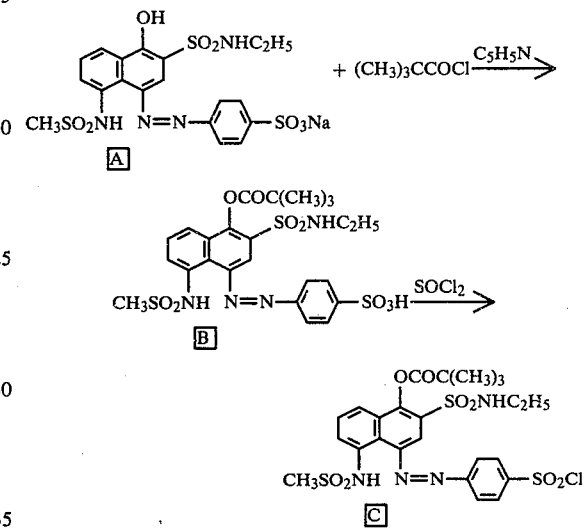

A mixture of 60.0 g (0.109 mole) of the sulfonic acid sodium salt A, 750 ml of dry acetone, and 300 ml of dry pyridine was treated dropwise with stirring at 0°–10° C. with 99 g (0.82 mole) of pivaloyl chloride and then stirred for 4 hours. The resulting pivalate-blocked sulfonic acid B was collected, stirred in 600 ml of dry ethyl acetate and 300 ml of dry dimethylformamide and treated dropwise at 0°–5° C. with 75 ml of thionyl chloride. The mixture was stirred for 3 hours at 0°–10° C. The solid was collected, washed with 50 ml of ethyl acetate, and then stirred for 10 minutes in 400 ml of water. The solid was again collected, washed with water, washed with two 50-ml portions of ethyl acetate, and then vacuum dried at room temperature to give 36.4 g of the orange sulfonyl chloride C, m.p. 216° C. (dec.)

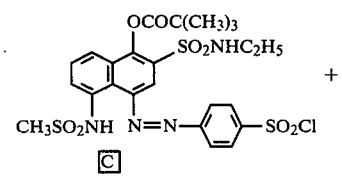

-continued

EXAMPLE 2

Preparation of Blocked Dye Compound No. 20

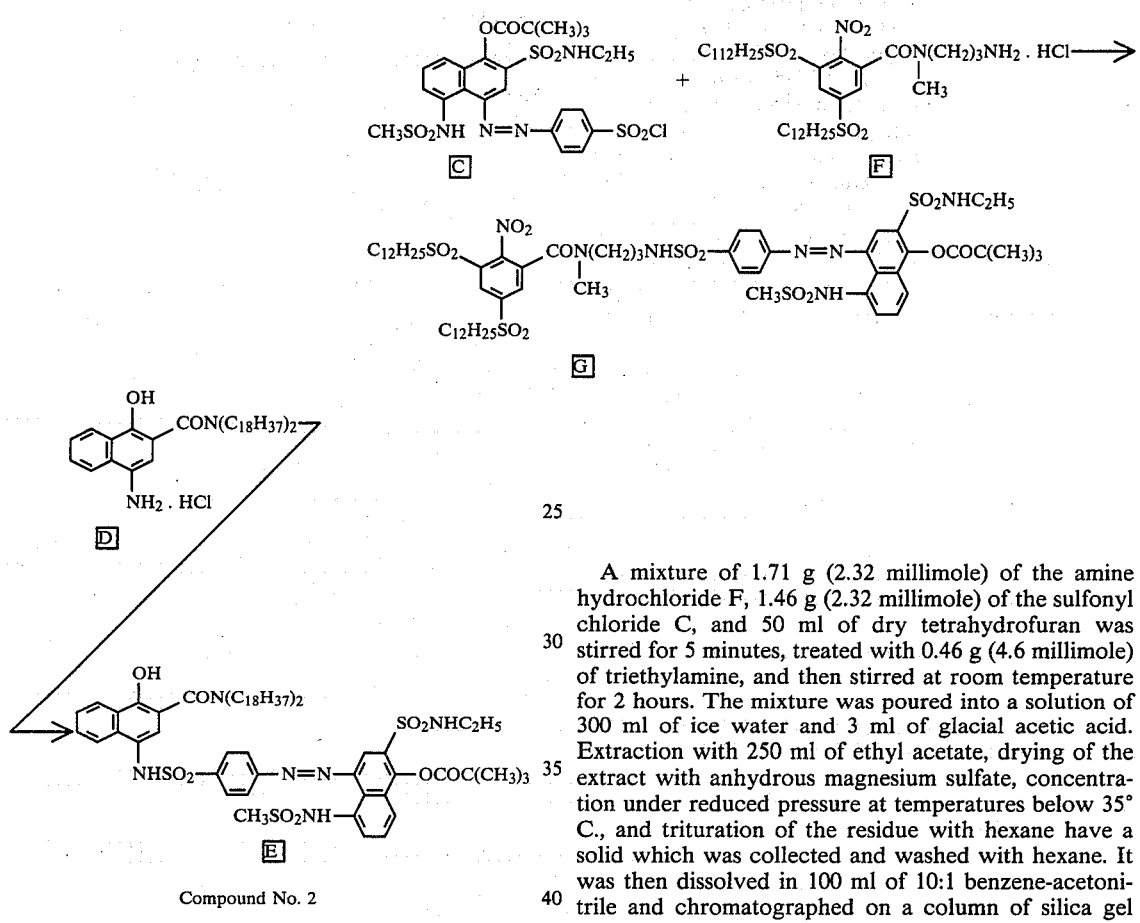

Compound No. 2

A mixture of 4.6 g (7.3 millimole) of the sulfonyl chloride C, 5.4 g of the amine hydrochloride D and 200 ml of dry tetrahydrofuran (THF) was stirred at 0° C. for 5 minutes in a slow nitrogen stream, treated with 10 ml of pyridine, stirred for 4 hours at 0° C., in a slow nitrogen stream, and then poured into an ice-cold solution of 50 ml of concentrated hydrochloric acid and 500 ml of water. Extraction with two 100-l portions of ethyl acetate, drying of the combined extracts with anhydrous magnesium sulfate, and removal of the solvent under vacuum at temperatures below 35° C. gave an orange gummy residue. Chromatography of this crude product on a column of silica gel (60–200 mesh) 2" in diameter and 16":long with 15:1 benzene-acetonitrile as the eluting solvent, combination of those fractions shown by thin layer chromatography (TLC) (silica gel plates, 4:1 benzene-acetonitrile as the eluting solvent) to contain the bright orange product zone, and concentration under vacuum at temperatures below 35° C. gave 3.2 g of orange glass. This material was dissolved in 50 ml of benzene and again chromatographed on silica gel using 15:1 benzene-acetonitrile as the eluting solvent. Removal of the solvent from the product-containing fractions as before gave 2.5 g of E as an orange-brown glass, m.p. 68°–110° C.

Calc'd. for $C_{71}H_{108}N_6O_{10}S_3$: C, 65.6; H, 8.3; N, 6.46; S, 7.39. Found: C, 65.9; H, 8.1; N, 6.7; S, 7.7.

A mixture of 1.71 g (2.32 millimole) of the amine hydrochloride F, 1.46 g (2.32 millimole) of the sulfonyl chloride C, and 50 ml of dry tetrahydrofuran was stirred for 5 minutes, treated with 0.46 g (4.6 millimole) of triethylamine, and then stirred at room temperature for 2 hours. The mixture was poured into a solution of 300 ml of ice water and 3 ml of glacial acetic acid. Extraction with 250 ml of ethyl acetate, drying of the extract with anhydrous magnesium sulfate, concentration under reduced pressure at temperatures below 35° C., and trituration of the residue with hexane have a solid which was collected and washed with hexane. It was then dissolved in 100 ml of 10:1 benzene-acetonitrile and chromatographed on a column of silica gel (60–200 mesh) 1" in diameter and 20" long using 10:1 benzene-acetonitrile as the eluting solvent. The fractions shown by TLC (silica gel plate, 4:1 benzene acetonitrile as eluting solvent) to contain only the orange product were combined and concentrated under vacuum at temperatures below 35° C. Trituration of the residue with 150 ml of hexane and collection and drying of the resulting solid gave 1.45 g (48.3% yield) of G as an orange powder, m.p. 98°–130° C.

Anal. Calc'd. for $C_{59}H_{89}N_7O_{15}S_5$: C, 54.7; H, 6.92; N, 7.56; S, 12.4. Found: C, 54.2; H, 7.2; N, 7.5; S, 12.9.

EXAMPLE 3

Preparation of Blocked Dye Compound No. 9

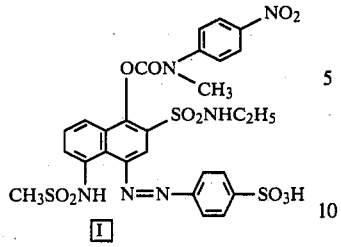

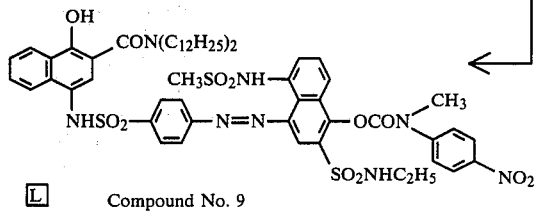

Compound No. 9

A mixture of 20.0 g (0.0364 mole) of the sodium salt A, 100 ml of pyridine, and 250 ml of dry acetone was treated with 15.8 g (0.0738 mole) of the carbamoyl chloride H, stirred overnight at room temperature, and then poured into 2 liters of hexane. The orange-red gum which separated was slurried in 1 liter of hexane, then with 700 ml of ethyl acetate, and finally with a solution of 50 ml of concentrated hydrochloric acid and 400 ml of water. The resulting solid was collected, washed with 100 ml of ethyl acetate, and dried at 30° C. to give 26.8 g of red compound I, m.p. 120°–125° C.

To 300 ml of dry THF at 0° C. in a slow nitrogen stream was added with stirring 14.0 g (0.0193 mole) of the sulfonyl chloride J and then 10.8 g (0.0200 mole) of the amine K. The mixture was stirred for 5 minutes, treated with 35 ml of pyridine, stirred under nitrogen at 0°–10° C. for 4 hours, and then poured into a mixture of 1 liter ice water, 100 ml of concentrated hydrochloric acid, and 250 ml of ethyl acetate. The aqueous layer was extracted with 250 ml of ethyl acetate. The combined ethyl acetate solutions were dried with anhydrous magnesium sulfate, concentrated under vacuum at temperatures below 35° C. to 50 ml and then poured slowly with manual stirring into 1 liter of hexane. Collection of the solid, washing with hexane, and drying at room temperature gave 21.1 g of orange-red crude product. This solid was dissolved in 350 ml of 10:1 benzene-acetonitrile and chromatographed on a silica gel (60–200 mesh) pad 6" wide and 8" deep using 10:1 benzene-acetonitrile as the eluting solvent. The fractions shown by TLC (silica gel plates developed in 6:1 benzene-acetonitrile) to contain the bright orange product were combined, concentrated to 100 ml, and poured slowly with manual stirring into 1 liter of hexane. Collection of the solid and drying gave 14.8 g of red-orange crude product. It was dissolved in 200 ml of 10:1 benzene-acetonitrile and chromatographed on a silica gel (60–200 mesh) column 3" in diameter and 2' long using 10:1 benzene-acetonitrile as the eluting solvent. The fractions shown by TLC to contain only the orange product were combined, concentrated to 75 ml and poured slowly with manual stirring into 1 liter of hexane. The solid was collected and dried to give 10.6 g of L, m.p. 95°–160° C.

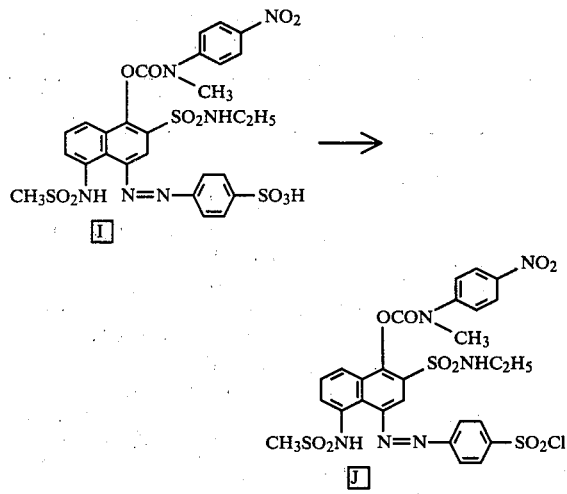

A mixture of 200 ml of dry ethyl acetate, 50 ml of DMF, and 26.0 g (0.0368 mole) of the sulfonic acid I, was stirred at 0°–10° C. and treated dropwise with 25 ml of thionyl chloride. After completion of the addition and stirring for 3 hours at 0°–10° C. the mixture was poured into a mixture of 1 liter of ice water, 50 ml of concentrated hydrochloric acid, and 200 ml of ethyl acetate. The solid was collected, washed with 100 ml of ethyl acetate and dried to give 20.2 g of J. (76% yield), m.p. 238°–242° C. (dec.).

Anal. Calc'd. for $C_{62}H_{82}N_8O_{12}S_3$: C, 60.7; H, 6.73; N, 9.13; S, 7.84. Found: C, 60.5; H, 6.7; N, 9.1; S, 7.8.

EXAMPLE 4

Evaluation of Sulfonamidonaphthol Compounds With Blocked Dyes

The redox-dye-releasing compounds containing the blocked image dye precursors according to this invention were evaluated for (1) rate of deblocking of the dye in the dispersed phase under a high pH condition; (2) the effect of the blocking group on imaging and rate of dye transfer through an integral-negative-receiver color transfer element and (3) the extent of deblocking under accelerated keeping conditions (raw stock incubation).

Procedure

Color transfer elements were prepared by coating a poly(ethylene terephthalate) film support with a layer comprising the compounds at $5 \times 10^{-5}$ moles/ft² ($5.4 \times 10^{-4}$ moles/m²) dissolved in an organic coupler solvent and dispersed in gelatin.

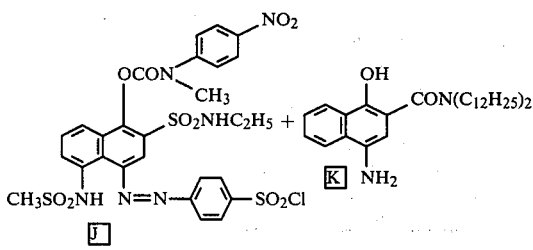

A second set of coatings were prepared as above except that a silver halide emulsion (0.8μ AgBr) was also added to the layer at 100 mg Ag/ft² (1.1 g Ag/m²).

(1) To determine the rate of deblocking, samples of the elements which did not contain the silver halide emulsion were subjected to a 1.0 N solution of sodium hydroxide (25° C.) and the appearance of the unblocked dye was monitored spectrophotometrically. Kinetic analysis of the data yields "$t_{\frac{1}{2}}$" parameters (time required to produce one-half the final density) which are recorded in Table I.

(2) To determine the effect of the blocking group on imaging and dye transfer relative to the corresponding unblocked compound, samples of the elements containing the silver halide emulsion were exposed through a graduated density step tablet and processed by rupturing a pod containing a portion of a viscous processing composition consisting of 20 g sodium hydroxide, 10 g potassium hydroxide, 25 g hydroxyethyl cellulose and 0.75 g 4-hydroxy-methyl-4-methyl-1-phenyl-3-pyrazolidone in 1.0 liter water while in contact with the receiver sheet comprising a transparent support having coated thereon a dye mordant layer and a titanium dioxide reflecting layer. The imagewise transfer of dye was then monitored through the receiver support by measuring the density to appropriate light sources in the maximum density areas at 30, 60 and 120 seconds. The $D_{min}$ and $D_{max}$ were also measured in receiving elements which were processed as above, separated from the corresponding photosensitive elements after 1 minute, and washed.

(3) Raw stock incubation tests were performed on samples of the no-silver-containing elements which were incubated under the conditions described in Table I and compared to additional control samples that were stored in a freezer. Raw stock stability was measured as the change in density at $\lambda_{max}$ as compared to the control.

All results are recorded in Table I.

EXAMPLE 5

For purposes of comparison compound 1 (of the invention) was compared with similar compounds (outside the invention) which differ only in the substituents $R^1$ and $R^2$. These compounds are as follows:

| Compound | $R^1$ | $R^2$ |
| --- | --- | --- |
| 1 | —C(CH$_3$)$_3$ | —C$_2$H$_5$ |
| I | —CH$_3$ | —C$_2$H$_5$ |
| II | —C(CH$_3$)$_3$ | —C(CH$_3$)$_3$ |

Compound I was prepared but could not be isolated since it unblocked during purification to give the corresponding hydroxy dye. Compound II was evaluated using the procedure described in Example 4. The results are reported in Table II below together, for comparison, with the results for compound 1 from Table I.

It will be observed from this Table that Compound II unblocked at an extremely slow rate and yielded a maximum density lower than the worst of the compounds of the invention reported in Table I.

TABLE II

| | DEBLOCKING RATE | RAW STOCK INCUBATION ΔD at λmax | | | | IMAGING | | | |
| --- | --- | --- | --- | --- | --- | --- | --- | --- | --- |
| | | 78° F./80% RH | | 20° F./50% RH | | Dens. thru INR | | | Dmax/Dmin |
| Compound No. | $t_{\frac{1}{2}}$(sec) | 1 wk. | 3 wks. | 1 wk. | 3 wks. | 30" | 60" | 120" | (60" peel apart) |
| 1 | 5 | 0.01 | 0.01 | 0.01 | 0.03 | .35 | .98 | 1.72 | 2.00/.41 |
| II | >300 sec. | 0.01 | 0.02 | 0.03 | 0.04 | .14 | .29 | .47 | .86/.24 |

EXAMPLE 6

A series of photographic elements was prepared comprising a poly(ethylene terephthalate) film support having coated thereon (1) a photosensitive layer containing a negative-working silver bromide emulsion at 100 mg Ag/ft² (1.08 g/m²), gelatin at 200 mg/ft² (2.16 g/m²), a magenta-dye-releasing compound at $3.5 \times 10^{-5}$ moles/ft² ($3.8 \times 10^{-4}$ moles/m²), a reducing agent (electron donor) at $7.0 \times 10^{-5}$ moles/ft² ($7.6 \times 10^{-4}$ moles/m²) and diethyl lauramide as a solvent for the RDR compound and the reducing agent; and (2) an overcoat layer containing gelatin at 50 mg/ft² (0.54 g/m²).

A second series of photographic elements was prepared as above except that the magenta-dye-releasing compounds were replaced with yellow-dye-releasing compounds coated at $5 \times 10^{-5}$ moles/ft² ($5.4 \times 10^{-4}$

TABLE I

| | DEBLOCKING RATE | RAW STOCK INCUBATION ΔD at λmax | | | | IMAGING | | | |
| --- | --- | --- | --- | --- | --- | --- | --- | --- | --- |
| | | 78° F./80% RH | | 120° F./50% RH | | Dens. thru INR | | | Dmax/Dmin |
| Compound No. | $t_{\frac{1}{2}}$(sec) | 1 wk. | 3 wks. | 1 wk. | 3 wks. | 30" | 60" | 120" | (60" peel apart) |
| 1 | <5 | .01 | .01 | .01 | .03 | .35 | .98 | 1.72 | 2.00/.41 |
| 2 | <5 | .00 | .00 | .00 | .00 | .50 | 1.28 | 1.90 | 2.06/.55 |
| 3 | <5 | .04 | .07 | .06 | .16 | .30 | .80 | 1.33 | 1.24/.53 |
| 4 | <5 | .00 | .00 | .01 | .04 | .57 | 1.22 | 1.83 | 1.80/.55 |
| 6 | 39 | .00 | .00 | .00 | .01 | .28 | .83 | 1.42 | 1.61/.52 |
| 7 | 30 | .00 | .01 | .02 | .02 | .25 | .70 | 1.34 | 1.69/.50 |
| 8 | 168 | — | .00 | — | .02 | .23 | .39 | .67 | 1.40/.38 |
| 9 | <5 | .01 | .01 | .02 | .04 | .48 | 1.14 | 1.84 | 2.00/.42 |
| 10 | 90 | .00 | .02 | .02 | .04 | .30 | .96 | 1.80 | 1.59/.34 |
| 11 | <5 | — | .01 | — | .36 | .39 | .98 | 1.58 | 1.56/.47 |
| 12 | 28 | .02 | .03 | .08 | .12 | .18 | .43 | .88 | 1.00/.16 |
| 17 | <5 | .00 | .00 | .00 | .01 | .46 | 1.32 | 1.95 | 2.58/.36 |
| 18 | <5 | .02 | .03 | .02 | .04 | .68 | 1.55 | 2.03 | 2.70/.46 |
| 19 | <5 | .01 | .02 | .02 | .03 | .56 | 1.37 | 1.92 | 2.60/.49 | moles/m²) and the reducing agent was coated at $1.0 \times 10^{-4}$ moles/ft² ($1.08 \times 10^{-3}$ moles/m²).

Samples of the elements were imagewise exposed through a graduated-density test object and processed by rupturing a pod containing a portion of a viscous processing composition consisting of 51 g potassium hydroxide, 20 g potassium bromide, 3.0 g 4-methyl-4-hydroxymethyl-1-phenyl-3-pyrazolidone, 2.0 g 5-methylbenzotriazole and 40 g carboxymethyl cellulose per liter of water while in contact with a dye mordanting receiving sheet.

After 10 minutes, the photosensitive elements were separated from the receiving sheets, the receiving sheets were washed in water, and well-defined transferred dye images were observed. Maximum and minimum reflection densities to the appropriate light sources were measured and are recorded in Table III.

TABLE III

| Compound No. | Electron Donor (See below) | $D_{max}$ | $D_{min}$ |
|---|---|---|---|
| 23 | A | 1.22 | 0.10 |
| 28 | A | 1.90 | 0.15 |
| 29 | B | 1.65 | 0.16 |
| 30 | B | 2.50 | 0.11 |
| 36 | B | 2.00 | 0.18 |
| 37 | B | 1.60 | 0.17 |
| 37 | D | 1.84 | 0.17 |
| 39 | A | 0.50 | 0.08 |
| 39 | C | 0.93 | 0.07 |
| 40 | B | 1.67 | 0.20 |

A 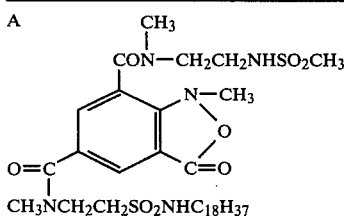

B 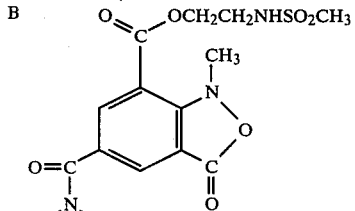

C 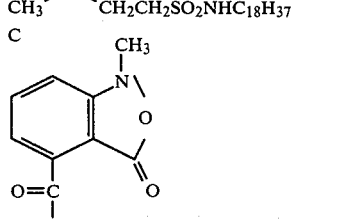

TABLE III-continued

| Compound No. | Electron Donor (See below) | $D_{max}$ | $D_{min}$ |
|---|---|---|---|

D 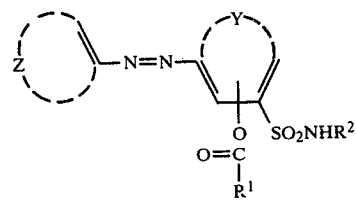

This invention has been described in detail with particular reference to preferred embodiments thereof, but it will be understood that variations and modifications can be effected within the spirit and scope of the invention.

What is claimed is:

1. A photographic element comprising a support, at least one photosensitive silver halide emulsion layer and, associated with the silver halide emulsion layer, a photographic image dye of the formula:

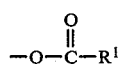

wherein:
Z represents the atoms to complete an aromatic carbocyclic or heterocyclic nucleus having at least one ring of 5 to 7 atoms;
Y represents the atoms to complete a benzene or naphthalene nucleus;

$$-O-\overset{O}{\underset{\|}{C}}-R^1$$

is ortho to the sulfamoyl group;
$R^1$ is a tertiary alkyl group of 4 to 20 carbon atoms or a tertiary amino group of the formula $-N(R^3)_2$ where each $R^3$ is independently alkyl of 1 to 10 carbon atoms or aryl of 6 to 20 carbon atoms; and
$R^2$ is a primary or secondary alkyl group of 1 to 20 carbon atoms.

2. A photographic element of claim 1 wherein $R^1$ is a tertiary amino group of the formula $-N(R^3)_2$ where each $R^3$ is independently alkyl of 1 to 10 carbon atoms or aryl of 6 to 20 carbon atoms.

3. A photographic element of claim 1 wherein $R^1$ is a tertiary alkyl group of 4 to 20 carbon atoms.

4. A photographic element of claim 3 wherein $R^1$ is a tertiary alkyl group of 4 to 8 carbon atoms.

5. A photographic element of claim 4 wherein $R^1$ is t-butyl.

6. A photographic element of claim 1 wherein $$-O-\overset{O}{\underset{\|}{C}}-R^1$$

is para to the azo group.

7. A photographic element of claim 1 wherein $R^2$ is a primary alkyl group of 1 to 4 carbon atoms.

8. A photographic element of claim 1 wherein Z represents the atoms necessary to complete a phenyl nucleus.

9. In a photographic assemblage comprising:
(a) a photosensitive element comprising a support having thereon at least one photosensitive silver halide emulsion layer containing a dye releasing compound;
(b) a dye image-receiving layer; and
(c) an alkaline processing composition and means for discharging same within said assemblage; said assemblage containing a silver halide developing agent, the improvement wherein the dye releasing compound has the formula:

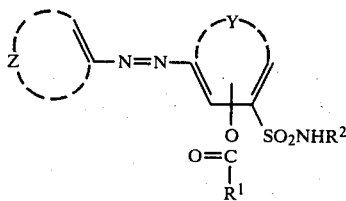

wherein:
Z represents the atoms to complete an aromatic carbocyclic or heterocyclic nucleus having at least one ring of 5 to 7 atoms;
Y represents the atoms to complete a benzene or naphthalene nucleus;

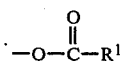

is ortho to the sulfamoyl group;
$R^1$ is a tertiary alkyl group of 4 to 20 carbon atoms or a tertiary amino group of the formula $-N(R^3)_2$ where each $R^3$ is independently alkyl of 1 to 10 carbon atoms or aryl of 6 to 20 carbon atoms;
$R^2$ is a primary or secondary alkyl group of 1 or 20 carbon atoms; and a ballasted carrier moiety attached to one of the nuclei completed by Z and Y.

10. A photographic assemblage of claim 9 wherein $R^1$ is a tertiary amino group of the formula $-N(R^3)_2$ where each $R^3$ is independently alkyl of 1 to 10 carbon atoms or aryl of 6 to 20 carbon atoms.

11. A photographic assemblage of claim 9 wherein $R^1$ is a tertiary alkyl group of 4 to 20 carbon atoms.

12. A photographic assemblage of claim 11 wherein $R^1$ is a tertiary alkyl group of 4 to 8 carbon atoms.

13. A photographic assemblage of claim 12 wherein $R^1$ is t-butyl.

14. A photographic assemblage of claim 9 wherein

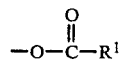

is para to the azo group.

15. A photographic assemblage of claim 9 wherein $R^2$ is a primary alkyl group of 1 to 4 carbon atoms.

16. A photographic assemblage of claim 9 wherein Z represents the atoms necessary to complete a phenyl nucleus.

17. A photographic assemblage of claim 9 wherein the ballasted carrier moiety is attached to the nucleus completed by Z.

18. A photographic assemblage of claim 9 wherein the ballasted carrier moiety is an ortho- or parasulfonamidophenol or naphthol carrier, the dye moiety being attached to the carrier moiety through the sulfonamido group.

19. A photographic assemblage of claim 9 wherein the ballasted carrier moiety is a quinone or nitrobenzene carrier, the dye moiety being attached to the carrier moiety through an electrophilic cleavage group ortho to the quinone oxygen group or the nitro group.

20. In an integral photographic assemblage comprising:
(a) a photosensitive element comprising a transparent support having thereon the following layers in sequence: a dye image-receiving layer, an alkaline solution permeable light-reflective layer, an alkaline solution-permeable, opaque layer, a red-sensitive silver halide emulsion layer having a ballasted cyan-dye-releasing compound associated therewith, a green-sensitive silver halide emulsion layer having a ballasted magenta-dye-releasing compound associated therewith, and a blue-sensitive silver halide emulsion layer having a ballasted yellow-dye-releasing compound associated therewith;
(b) a transparent sheet superposed over said blue-sensitive silver halide emulsion layer and comprising a transparent support having thereon, in sequence, a neutralizing layer and a timing layer; and
(c) a rupturable container containing an alkaline processing composition and an opacifying agent which is so positioned during processing of said assemblage that a compressive force applied to said container will effect a discharge of the containers contents between said transparent sheet and said blue-sensitive silver halide emulsion layer; said assemblage containing a silver halide developing agent; the improvement wherein at least one of said dye releasing compounds has the structure:

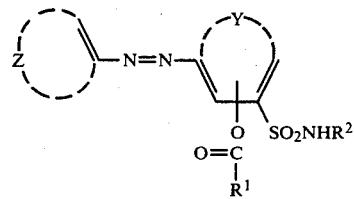

wherein:
Z represents the atoms to complete an aromatic carbocyclic or heterocyclic nucleus having at least one ring of 5 to 7 atoms;
Y represents the atoms to complete a benzene or naphthalene nucleus;

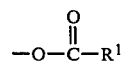

is ortho to the sulfamoyl group;
$R^1$ is a tertiary alkyl group of 4 to 20 carbon atoms or a tertiary amino group of the formula $-N(R^3)_2$ where each $R^3$ is independently alkyl of 1 to 10 carbon atoms or aryl of 6 to 20 carbon atoms;

$R^2$ is a primary or secondary alkyl group of 1 to 20 carbon atoms; and a ballasted carrier moiety attached to one of the nuclei completed by Z and Y.

21. A photographic assemblage of claim 20 wherein:
$R^1$ is a tertiary alkyl group of 4 to 8 carbon atoms;

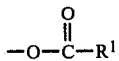

is para to the azo group, and
$R^2$ is a primary alkyl group of 1 to 4 carbon atoms.

22. A photographic assemblage of claim 21 wherein $R^1$ is t-butyl.

23. A photographic assemblage of claim 22 wherein Z represents the atoms necessary to complete a phenyl nucleus and the ballasted carrier moiety is attached to the nucleus completed by Z.

24. A photographic assemblage of claim 23 wherein the ballasted carrier moiety is an ortho- or parasulfonamidophenol or naphthol carrier, the dye moiety being attached to the carrier moiety through the sulfonamido group.

25. A photographic assemblage of claim 23 wherein the ballasted carrier moiety is a quinone or nitrobenzene carrier, the dye moiety being attached to the carrier moiety through an electrophilic cleavage group ortho to the quinone oxygen group or the nitrobenzene group.

26. A process for producing a photographic image comprising:
  (a) treating an imagewise-exposed photographic element of any one of claims 8 or 19 with an alkaline processing composition in the presence of a silver halide developing agent to effect development of each of the exposed silver halide emulsion layers, thereby
  (b) releasing imagewise a diffusible dye from the dye releasing compound as a function of development of each of the silver halide emulsion layers; and
  (c) diffusing at least a portion of the imagewise distribution of diffusible dye out of the layer in which it is coated.

27. A process of claim 26 wherein after being released from the dye-releasing compound the dye diffuses to a dye-image-receiving layer to provide a transfer image.

28. A process of claim 26 wherein after being released from the dye-releasing compound the dye is removed from the element while retaining in the element an imagewise distribution of dye releasing compound to provide a retained image.

* * * * *